(12) United States Patent
Klemann et al.

(10) Patent No.: US 7,879,384 B2
(45) Date of Patent: Feb. 1, 2011

(54) STRUCTURED GLYCEROL ESTERS USEFUL AS EDIBLE MOISTURE BARRIERS

(75) Inventors: Lawrence P. Klemann, Annandale, NJ (US); Jeffrey B. Fine, Livingston, NJ (US); Dennis A. Kim, Palatine, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 706 days.

(21) Appl. No.: 11/937,124

(22) Filed: Nov. 8, 2007

(65) Prior Publication Data

US 2009/0123632 A1    May 14, 2009

(51) Int. Cl.
*A23D 9/00* (2006.01)
*A23P 1/08* (2006.01)

(52) U.S. Cl. .................. 426/601; 426/606; 426/607; 426/302

(58) Field of Classification Search ................. 426/601, 426/606, 607
See application file for complete search history.

(56) References Cited

U.S. PATENT DOCUMENTS

| | | | |
|---|---|---|---|
| 2,614,937 A | 10/1952 | Baur | |
| 2,615,159 A | 10/1952 | Jackson | |
| 2,615,160 A | 10/1952 | Baur | |
| 3,192,057 A | 6/1965 | Hines et al. | |
| 3,388,085 A | 6/1968 | Levkoff et al. | |
| 4,272,548 A | 6/1981 | Gatzen et al. | |
| 4,364,868 A | 12/1982 | Hargreaves | |
| 4,390,561 A | 6/1983 | Blair et al. | |
| 4,447,462 A | 5/1984 | Tafuri et al. | |
| 4,479,976 A | 10/1984 | Lansbergen et al. | |
| 4,486,457 A | 12/1984 | Schijf et al. | |
| 4,504,503 A | 3/1985 | Biernoth et al. | |
| 4,671,963 A | 6/1987 | Germino et al. | |
| 4,832,975 A | 5/1989 | Yang | |
| 4,839,192 A | 6/1989 | Sagi et al. | |
| 4,865,866 A | 9/1989 | Moore | |
| 4,873,109 A | 10/1989 | Tanaka et al. | |
| 4,880,646 A | 11/1989 | Lew et al. | |
| 4,883,684 A | 11/1989 | Yang | |
| 4,915,971 A | 4/1990 | Fennema et al. | |
| 5,066,510 A * | 11/1991 | Ehrman et al. | ............... 426/607 |
| 5,071,669 A | 12/1991 | Seiden | |
| 5,130,151 A | 7/1992 | Averbach | |
| 5,142,071 A | 8/1992 | Kluesener et al. | |
| 5,142,072 A | 8/1992 | Stipp et al. | |
| 5,258,197 A | 11/1993 | Wheeler et al. | |
| 5,288,512 A | 2/1994 | Seiden | |
| 5,312,836 A | 5/1994 | Bistrian | |
| 5,362,508 A | 11/1994 | Wheeler et al. | |
| 5,374,438 A | 12/1994 | Yost | |
| 5,378,490 A | 1/1995 | Wheeler et al. | |
| 5,380,544 A | 1/1995 | Klemann et al. | |
| 5,407,695 A | 4/1995 | Wheeler et al. | |
| 5,411,756 A | 5/1995 | Wheeler et al. | |
| 5,419,925 A | 5/1995 | Seiden et al. | |
| 5,422,131 A | 6/1995 | Elsen et al. | |
| 5,456,939 A | 10/1995 | Wheeler et al. | |
| 5,458,910 A | 10/1995 | Gruetzmacher et al. | |
| 5,470,598 A | 11/1995 | Scavone | |
| 5,490,995 A | 2/1996 | Corrigan | |
| 5,492,714 A | 2/1996 | Guskey et al. | |
| 5,504,231 A | 4/1996 | Guskey | |
| 5,552,174 A | 9/1996 | Wheeler et al. | |
| 5,589,216 A | 12/1996 | Guskey et al. | |
| 5,612,080 A | 3/1997 | Gruetzmacher et al. | |
| 5,662,953 A | 9/1997 | Wheeler et al. | |
| 5,683,738 A | 11/1997 | Gruetzmacher et al. | |
| 5,879,735 A | 3/1999 | Cain et al. | |
| 5,912,042 A | 6/1999 | Cain et al. | |
| 6,022,577 A | 2/2000 | Chrysam et al. | |
| 6,277,432 B1 | 8/2001 | Chang | |
| 6,369,252 B1 | 4/2002 | Akoh | |
| 7,241,468 B2 | 7/2007 | Naber et al. | |
| 7,517,545 B2 | 4/2009 | Kaimal et al. | |
| 2003/0143312 A1 | 7/2003 | Tamarkin et al. | |

(Continued)

FOREIGN PATENT DOCUMENTS

EP           0 322 027 A2    6/1989

(Continued)

OTHER PUBLICATIONS

Martin Anker et al., "Improved Water Vapor Barrier Of Whey Protein Films By Addition Of An Acetylated Monoglyceride." Innovative Food Science & Emerging Technologies, vol. 3, 2002, pp. 81-92.

(Continued)

*Primary Examiner*—Carolyn A Paden
(74) *Attorney, Agent, or Firm*—Fitch, Even, Tabin & Flannery

(57) ABSTRACT

Lipid compositions are provided that are effective as edible moisture barriers for reducing moisture migration between food components. The lipid compositions include a mixture of structured glycerol ester (SGE) compositions bearing short chain (two to four carbons), medium chain (six to twelve carbons), and saturated long chain (fourteen to twenty-two carbons) fatty acid residues. The SGE compositions of the invention are reduced calorie and fully saturated, contain essentially zero trans-unsaturated fatty acids, and contain components present in stable alpha crystal forms.

23 Claims, 10 Drawing Sheets

U.S. PATENT DOCUMENTS

| | | | |
|---|---|---|---|
| 2003/0215556 A1 | 11/2003 | Naber et al. |
| 2004/0043125 A1 | 3/2004 | Kaimal et al. |
| 2004/0052898 A1 | 3/2004 | Yatka et al. |
| 2004/0101601 A1 | 5/2004 | Loh et al. |
| 2004/0122246 A1 | 6/2004 | Sparso et al. |
| 2004/0166204 A1 | 8/2004 | Smith et al. |
| 2004/0170720 A1 | 9/2004 | Yatka et al. |
| 2005/0163909 A1 | 7/2005 | Cleenewerck et al. |
| 2006/0154986 A1 | 7/2006 | Finley et al. |
| 2009/0123634 A1 | 5/2009 | Klemann et al. |
| 2009/0123635 A1 | 5/2009 | Klemann et al. |

FOREIGN PATENT DOCUMENTS

| | | |
|---|---|---|
| EP | 0 390 410 A2 | 10/1990 |
| EP | 0 505 408 B1 | 9/1992 |
| EP | 0 506 739 B1 | 10/1992 |
| EP | 0 666 839 B1 | 8/1995 |
| EP | 0 793 421 B1 | 9/1997 |
| EP | 1 051 903 A1 | 11/2000 |
| EP | 1586242 | 10/2005 |
| EP | 1 783 200 A1 | 5/2007 |
| EP | 2 057 902 A1 | 5/2009 |
| GB | 816343 | 7/1959 |
| GB | 822730 | 10/1959 |
| GB | 2 239 256 A | 6/1991 |
| JP | 64-019042 A | 1/1989 |
| JP | 02-158695 A | 6/1990 |
| JP | 2002095426 A | 4/2002 |
| JP | 2005237319 | 9/2005 |
| WO | 91/09098 A1 | 6/1991 |
| WO | 91/09099 A1 | 6/1991 |
| WO | 91/10368 A1 | 7/1991 |
| WO | 92/01394 A1 | 2/1992 |
| WO | 93/00016 A1 | 1/1993 |
| WO | 94/10126 A1 | 5/1994 |
| WO | 94/16573 A1 | 8/1994 |
| WO | 94/19961 A1 | 9/1994 |
| WO | 96/32022 | 10/1996 |
| WO | 01/43558 A2 | 6/2001 |
| WO | 2004/039929 A1 | 5/2004 |
| WO | 2006/052870 A2 | 5/2006 |
| WO | 2006/076433 A1 | 7/2006 |

OTHER PUBLICATIONS

I. Greener Donhowe et al., "The Effect of Relative Humidity Gradient On Water Vapor Permeance Of Lipid And Lipid-Hydrocolloid Bilayer Films." Journal of the American Oil Chemists' Society (1992), vol. 69, No. 11, pp. 1081-1087.

Mark Dreher et al., "Salatrim: A Triglyceride-Based Fat Replacer," Nutrition Today, vol. 33, No. 4, Jul./Aug. 1998, pp. 164-170.

L. P. Klemann et al., "Estimation of the Absorption Coefficient of Stearic Acid in SALATRIM Fats," Journal of Agricultural and Food Chemistry, vol. 42, No. 2, 1994, pp. 484-488.

Lawrence P. Klemann et al., "Random Nature of Triacylglycerols Produced by the Catalyzed Interesterification of Short- and Long-Chain Fatty Acid Triglycerides," Journal of Agricultural and Food Chemistry, vol. 42, No. 2, 1994, pp. 442-446.

John W. Finley et al., "Growth Method for Estimating the Caloric Availability of Fats and Oils," Journal of Agricultural and Food Chemistry, vol. 42, No. 2, 1994, pp. 489-494.

Joanne P. Kennedy, "Structured Lipids: Fats of the Future," Food Technology, Nov. 1991, pp. 76-83.

Fred H. Mattson et al., "The Absorbability by Rats of Various Triglycerides of Stearic and Oleic Acid and the Effect of Dietary Calcium and Magnesium," Journal of Nutrition, vol. 109, 1979, pp. 1682-1687.

Valerie Morillon et al., "Factors Affecting The Moisture Permeability Of Lipid-Based Edible Films: A Review." Critical Reviews in Food Science and Nutrition, vol. 42, No. 1, 2002, pp. 67-89.

Lawrence P. Klemann, "Effects of Interesterification on the Physical Properties of Fats," Abstract of presentation at the AOCS International Conference on the Physical Properties of Fats, Oils and Emulsifiers, Chicago, Illinois, Sep. 1997, one page.

European Search Report for EP Application No. 08168422, dated Mar. 27, 2009.

Ghosh et al., Moisture Migration Through Chocolate-Flavored Confectionery Coatings, 66 Journal of Food Engineering 177-186 (2005).

Emile A. M. de Deckere et al., "Effects of conjugated linoleic acid (CLA) isomers on lipid levels and peroxisome proliferation in the hamster," British Journal of Nutrition, vol. 82, No. 4, 1999, pp. 309-317.

Ikuo Ikeda, "Digestion and Absorption of Structured Lipids," Fat Digestion and Absorption, American Oil Chemists' Society, Illinois, 2000, Chapter 11, pp. 235-243.

Michael H. Auerbach, Lawrence P. Klemann, and Jenifer A. Heydinger, "Reduced-Energy Lipids," Structured and Modified Lipids, CRC Press, New York, 2001, Chapter 18, pp. 485-510.

James P. Miller, "ADM to enter joint venture for cooking oil," Chicago Tribune, Jun. 13, 2001, 2 pages.

David Jago, "Health Begets Wealth," Prepared Foods, Apr. 2001, pp. 21-22.

Robyn M. Treadwell et al., "Glyceride Stearic Acid Content and Structure Affect the Energy Available to Growing Rats," Journal of Nutrition, vol. 132, 2002, pp. 3356-3362.

Kevin C. Maki et al., "Consumption of diacylglycerol oil as part of a reduced-energy diet enhances loss of body weight and fat in comparison with consumption of a triacylglycerol control oil," American Journal of Clinical Nutrition, vol. 76, 2002, pp. 1230-1236.

P. S. Maclean et al., "Caloric Availability of Fats," Center for Human Nutrition, University of Colorado HSC, Kraft Foods Sponsored Research, Jan. 4, 2004, 13 pages.

Paul S. Maclean et al., "Metabolic adjustments with the development, treatment, and recurrence of obesity in obesity-prone rats," American Journal of Physiology—Regulatory, Integrative and Comparative Physiology, vol. 287, Aug. 2004, pp. R288-R297.

European Patent Office Extended European Search Report for European Application No. 08168426.8 dated Feb. 6, 2009 (10 pages).

Casimir C. Akoh and Kuan-Hsiang Huang, "Enzymatic Synthesis of Structured Lipids: Tranesterification of Triolein and Caprylic Acid," Journal of Food Lipids, vol. 2, Issue 4, Dec. 1995, pp. 219-230.

Ki-Teak Lee and Casimir C. Akoh, "Characterization of Enzymatically Synthesized Structured Lipids Containing Eicosapentaenoic, Docosahexaenoic, and Caprylic Acids," Journal of the American Oil Chemists' Society, vol. 75, No. 4, Apr. 1998, pp. 495-499.

H. T. Osborn and C. C. Akoh, "Structured Lipids—Novel Fats with Medical, Nutraceutical, and Food Applications," Comprehensive Reviews in Food Science and Food Safety, vol. 3, Jan. 2002, pp. 93-103.

European Patent Office Extended Search Report for European Application No. 08167992.0 dated Feb. 25, 2009 (12 pages).

Junichi Ozaki, "Ober den relativen Nahrwert der synthetischen Fette," Biochemische Zeitschrift, 177, Berlin, 1926, pp. 156-167.

H. C. Eckstein, "The Influence of Diet on the Body Fat of the White Rat," Journal of Biological Chemistry, vol. 81, 1929, pp. 613-628.

Harry Sobotka and David Glick, "Lipolytic Enzymes: 1. Studies on the Mechanism of Lipolytic Enzyme Actions," Journal of Biological Chemistry, vol. 105, 1934, pp. 199-219.

L. Emmett Holt, Jr. et al., "Studies in Fat Metabolism," Journal of Pediatrics, vol. 6, No. 4, Apr. 1935, pp. 427-480.

S. S. Weinstein and A. M. Wynne, "Studies on Pancreatic Lipase II. Influence of Various Components on the Hydrolytic Activity," Journal of Biological Chemistry, vol. 112, 1936, pp. 649-660.

Fritz Schonheyder and Kirsten Volqvartz, "On the Activity of Lipases Toward Triglycerides," Enzymologia Acta Biocatalytica, Elsevier Publishing Company Inc., New York, vol. XI, 1943, pp. 178-185.

F. L. Jackson and E. S. Lutton, "The Polymorphism of 1-Stearyl- and 1-Palmityldiacetin, -dibutyrin, -dicaproin and 1-Stearyldipropionin," Journal of the American Chemical Society, vol. 74, Oct. 5, 1952, pp. 4827-4829.

Herbert A. Ravin and Arnold M. Seligman, "Determinants for the Specificity of Action of Pancreatic Lipase," Archives of Biochemistry and Biophysics, Academic Press, Inc., vol. 42, No. 2, Feb. 1953, pp. 337-354.

Fred J. Baur, "Acetin Fats. I. Products Made from Mixed Acetin Fats," Journal of the American Oil Chemists' Society, vol. 31, Apr. 1954, pp. 147-151.

H. J. Deuel, Jr., "III. Digestibility of Fats," The Lipids: Their Chemistry and Biochemistry, vol. II, Interscience Publishers, 1955, pp. 218-227.

F. L. Jackson, R. L. Wille, and E. S. Lutton, "The Polymorphism of 2-Acetyl-, 2-Butyrl- and 2-Caproyldistearin and -dipalmitin," Journal of the American Chemical Society, vol. 73, 1951, pp. 4280-4284.

R. 0. Feuge, "Acetoglycerides—New Fat Products of Potential Value to the Food Industry," Food Technology, vol. 9, 1955, pp. 314-318.

Selma E. Snyderman, Soledad Morales, and L. Emmett Holt, Jr., "Premature Infants," Archives of Disease in Childhood, British Medical Association, London, Vol. XXX, 1955, pp. 83-84.

Arunabh Bhattacharya et al., "The Combination of Dietary Conjugated Linoleic Acid and Treadmill Exercise Lowers Gain in Body Fat Mass and Enhances Lean Body Mass in High Fat Fed Male Balb/C Mice," Journal of Nutrition, vol. 135, 2005, pp. 1124-1130.

Iwona Rudkowska et al., "Phytosterols mixed with medium-chain triglycerides and high-oleic canola oil decrease plasma lipids in overweight men," Metabolism Clinical and Experimental, vol. 55, 2006, pp. 391-395.

Anthony M. Ambrose and Dorothy J. Robbins, "Studies on Comparative Absorption and Digestibility of Acetoglycerides," Journal of Nutrition, vol. 58, 1956, pp. 113-124.

F. H. Mattson et al., "Short-Term Feeding Studies on Acetin Fats," Journal of Nutrition, vol. 59, No. 2, Jun. 1956, pp. 277-285.

Hans Kaunitz et al., "Nutritional Properties of the Triglycerides of Saturated Fatty Acids of Medium Chain-Length," Journal of the American Oil Chemists' Society, vol. 35, Jan. 1958, pp. 10-13.

K. K. Carroll, "Digestibility of Individual Fatty Acids in the Rat," Journal of Nutrition, vol. 64, 1958, pp. 399-410.

F. H. Mattson, "The Absorbability of Stearic Acid When Fed as a Simple or Mixed Triglyceride," Journal of Nutrition, vol. 69, 1959, pp. 338-342.

E. D. Wills, "Studies on the Purification and Specificty of Pancreatic Lipase," The Enzymes of Lipid Metabolism, Permgon Press, New York, 1961, pp. 13-19.

G. Clement, J. Clement, and J. Bezard, "Action of Human Pancreatic Lipase on Synthetic Mixed Symmetrical Triglycerides of Long-Chain Acids and Butyric Acid," Biochemical and Biophysical Research Communications, vol. 8, No. 3, 1962, pp. 238-242.

P. Desnuelle and P. Savary, "Specificities of Lipases," Journal of Lipid Research, vol. 4, No. 4, Oct. 1963, pp. 369-384.

R. D. Coleman, L. A. Gayle, and Roslyn B. Alfin-Slater, "A Nurtritional Evaluation of Acetostearins in Rats" Journal of the American Oil Chemists' Society, vol. 40, Dec. 1963, pp. 737-742.

J. W. McAtee, C. O. Little, and G. E. Mitchell, Jr., "Utilization of Rumen Metabolites as Energy Sources in Rats," Life Sciences, vol. 7, No. 14, 1968, pp. 769-775.

R. M. Tomarelli et al., "Effect of Positional Distribution on the Absorption of the Fatty Acids of Human Milk and Infant Formulas," Journal of Nutrition, vol. 95, 1968, pp. 583-590.

N. V. Lovegren and M. S. Gray, "Polymorphism of Saturated Triglycerides: I. 1,3-Distearo Triglycerides," Journal of the American Oil Chemists' Society, vol. 55, March 1978, pp. 310-316.

Sami A. Hashim and Vigen K. Babayan, "Studies in man of partially absorbed dietary fats," American Journal of Clincial Nutrition, vol. 31, Oct. 1978, pp. S273-S276.

Marvin W. Formo et al., "Fatty Acids," Bailey's Industrial Oil and Fat Products, vol. 1, Fourth Edition, John Wiley & Sons, New York, 1979, pp. 16-17.

J. H. Cummings, "Short chain fatty acids in the human colon," Gut, vol. 22, 1981, pp. 763-779.

Chi-Sun Wang et al., "Studies on The Substrate Specificity of Purified Human Milk Bile Salt-activated Lipase," Journal of Biological Chemistry, vol. 258, No. 15, Aug. 10, 1983, pp. 9197-9202.

James F. Mead et al., "Nutritional Value of Lipids," LIPIDS Chemistry, Biochemistry, and Nutrition, Plenum Press, New York, 1986, Chapter 19, pp. 459-473.

V. K. Babayan, "Medium Chain Triglycerides," Dietary Fat Requirements in Health and Development, American Oil Chemists' Society, Illinois, 1988, Chapter 5, pp. 73-86.

Casimir C. Akoh and Barry G. Swanson, "Preperation of Trehalose and Sorbitol Fatty Acid Polyesters by Interesterification," Journal of the American Oil Chemists' Society, vol. 66, No. 11, Nov. 1989, pp. 1581-1587.

Ronald P. Mensink and Martijn B. Katan, "Effect of Dietary Trans Fatty Acids on High-Density and Low-Density Lipoprotein Cholesterol Levels in Healthy Subjects," New England Journal of Medicine, vol. 323, No. 7, Aug. 16, 1990, pp. 439-445.

John M. Talbot, Sue Ann Anderson and Kenneth D. Fisher, Life Sciences Research Office, "The Evaluatiion of the Health Aspects of Using Certain Triacylglycerols as Food Ingredients," Federation of American Societies for Experimental Biology, Nabisco Food Group, Maryland, Aug. 1993, 73 pages.

Journal of Agricultural And Food Chemistry, American Chemical Society, vol. 42, No. 2, Feb. 1994, pp. 432-604.

Johnnie R. Hayes et al., "In Vivo Metaboloism of SALATRIM Fats in the Rat," Journal of Agricultural and Food Chemistry, vol. 42, No. 2, 1994, pp. 500-514.

"Solid Fat Content (SFC) by Low Resolution Nuclear Magnetic Resonance—The Direct Method," Sampling And Analysis Of Commerical Fats And Oils, AOCS Official Method Cd 16b-93, Revised 1999, pp. 1-10.

* cited by examiner

STRUCTURED GLYCEROL ESTERS USEFUL AS EDIBLE MOISTURE BARRIERS

The present invention generally relates to edible moisture barriers for food products and, in particular, to edible moisture barriers incorporating structured glycerol esters bearing combinations of short chain (two to four carbons), medium chain (six to twelve carbons), and saturated long chain (fourteen to twenty-two carbons) fatty acid residues. The edible moisture barriers of the invention are reduced calorie, fully saturated, and trans-fat free.

BACKGROUND OF THE INVENTION

For many food products, moisture levels must be maintained if the product is to exhibit optimum organoleptic properties, quality, and taste. Moisture migration in finished food products can seriously compromise quality, stability, and organoleptic properties. In addition, many chemical and enzymatic deteriorative reactions proceed at rates partially governed by the moisture content of foods. Excessive rates of these reactions can promote deleterious changes in the flavor, color, texture, and nutritive value of food products.

In multi-component food products, particularly those having components with different moisture contents and water activities (e.g., prepackaged cheese and crackers or prepackaged bagel and cheese cream products), moisture can migrate between adjacent components and alter characteristics and organoleptic properties of the components. In addition to compromising the quality of finished food products, moisture migration can hinder production and distribution of food products. Thus, for example, the cheese in a cheese/cracker product could dry out while, at the same time, the cracker loses its crispness.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as oils, fats, and waxes, are composed of lipophilic water insoluble molecules capable of forming a water impervious structure, they have been investigated for use in moisture barrier films. With respect to oleaginous materials derived from lipids (i.e., sucrose polyesters, acetylated monoglycerides, and the like) and/or other film-forming lipids, it has been shown that, unless an undesirably thick coating is used, the barrier is not sufficiently effective for food products requiring long shelf life. Such film-forming lipids tend to become unstable under normal practical use conditions and lose film integrity and barrier effectiveness. In addition to structural instability, such as oiling out or cracking upon handling or with changes in temperatures, such lipid-based moisture barriers have disadvantages of being organoleptically unacceptable (e.g., greasy or waxy mouthfeel).

Accordingly, many of the barriers in the art use a water-impermeable lipid in association with hydrocolloids or polysaccharides such as alginate, pectin, carrageenan, cellulose derivatives, starch, starch hydrolysates, and/or gelatin to form gel structures or crosslinked semi-rigid matrixes to entrap and/or immobilize the nonaqueous or lipid material. In many cases these components are formed as bilayer films. These bilayer films may be precast and applied to a food surface as a self-supporting film with the lipid layer oriented toward the component with highest water activity. See, for example, U.S. Pat. No. 4,671,963 (Jun. 9, 1987); U.S. Pat. No. 4,880,646 (Nov. 14, 1987); U.S. Pat. No. 4,915,971 (Apr. 10, 1990); U.S. Pat. No. 5,130,151 (Jul. 14, 1992).

There are, however, a number of drawbacks associated with these moisture barriers. The hydrocolloids themselves are hydrophilic and/or water soluble and thus tend to absorb water with time. The absorption of water by the hydrophilic material in a moisture barrier is greatly accelerated while the film is directly in contact with foods having a water activity ($A_w$) above 0.75. In addition, some hydrocolloids tend to make the barriers fairly stiff, requiring the addition of a hydrophilic plasticizer (e.g., polyol) to increase flexibility. These plasticizers are often strong moisture binders themselves thus promoting moisture migration into the barriers and decreased structural stability and effectiveness of the barriers. Furthermore, the texture and the required thickness of some of these barriers may make their presence perceptible and objectionable when the product is consumed. Additional processing steps (casting and drying) required to form these films make them difficult to use in high speed commercial production.

U.S. Publication No. 2004/0101601 to Loh et al. and U.S. Publication No. 2004/0166204 to Smith et al. describe edible moisture barriers formed of a microparticulated high melting lipid (1-35 weight percent) and a low melting triglyceride blend (65-99 weight percent). These edible moisture barriers are supported by crystalline fat particles which help immobilize the liquid oil fraction in the barrier. The fat particles of the moisture barriers of these references initially crystallize in the alpha crystal form but this crystal form is lost by recrystallization to beta and beta prime morphologies.

The drawbacks related to the moisture barriers in the art include their caloric content and the presence of trans fats. Trans fats are known to raise LDL cholesterol levels, lower HDL cholesterol levels, and increase the risk for coronary heart disease. The FDA estimates that the average daily intake of trans fats per individual in the United States is about 5.3 grams or 2.6 percent of calories per day. (Food Labeling: Trans Fatty Acids in Nutrition Labeling, Nutrient Content Claims, and Health Claims, 68 Fed. Reg. 41,434, 41,444 (Jul. 11, 2003)). As of Jan. 1, 2006, the U.S. Food & Drug Administration required that trans fats be identified in the nutrition labels of all conventional foods and dietary supplements. Under FDA guidelines, for a food or fat to be listed as having zero trans-fatty acids, it has to contain less than about 0.5 grams of trans-fatty acids per serving. To achieve such levels in a typical baked snack food product, the trans-fatty acids in the particular ingredient oils must be kept well below about 3 to about 7 percent.

Edible, low calorie fat compositions based on mixtures of triglycerides having combinations of short and long chain fatty acid residues are known in the art. Salatrim (an acronym for "short- and long-chain acyl triglyceride molecules") is a family of reduced calorie triacylglycerols comprising short chain and saturated long chain acid residues. Salatrim is prepared by interesterification of triacetin, tripropionin, or tributyrin, or their mixtures with either hydrogenated canola, soybean, cottonseed, or sunflower oil. Salatrim contains saturated long chain acids and short chain acids and typically contain 30-67 percent mole percent short chain fatty acids and 33-70 mole percent long chain fatty acids. It has further been found that these lipids exhibit stable alpha crystal habits. Salatrim is commercially available as BENEFAT® from Danisco A/S. See also, for example, U.S. Pat. No. 5,662,953 (Sep. 2, 1997) and U.S. Pat. No. 6,277,432 (Aug. 21, 2001). The '432 patent describes plastic fat compositions comprising a triglyceride mixture where the mixture contains 40 to 95 weight percent SSL and SLS species and 5 to 60 weight percent LLS and LSL species, and where 3 to 40 weight percent of the long chain fatty acid groups are unsaturated. The '953 patent describes triglyceride compositions comprising at least about 75 percent by weight SSL and SLS species and between 0.1 to 25 percent by weight LLS and LSL species, which can be coated on chocolate confections to reduce bloom.

Edible, low calorie fat compositions based on mixtures of triglycerides having combinations of short, medium, and long chain fatty acid residues are known in the art. See, for example, U.S. Pat. No. 5,380,544 (Mar. 5, 1993). These fat compositions are useful for incorporation into shortening and margarine products. The '544 patent describes fat compositions containing at least 24 percent, preferably at least 34 percent, and in some embodiments at least about 50 to 80 percent or higher of so-called "SML," "SLM," and "MSL" triglycerides bearing a short chain residue (S), a medium chain residue (M), and a saturated long chain residue (L). Preferred methods maximize the isolation of "SML," "SLM," and "MSL" triglycerides by removing "SSS," "SSM," "MMS," "MSM," "MMM," "SSL," and "SLS" species from the reaction mixture.

The edible moisture barriers provided by the present invention represent a significant improvement over prior art moisture barriers and overcome the problems associated with the prior art moisture barriers. The edible moisture barriers of the present invention have reduced caloric value, are essentially free of trans-unsaturated fatty acids, contain a significant concentration of triacylglycerols that have melting points below ambient temperature and crystallize in stable alpha-crystal morphologies, and have improved moisture barrier properties over the barriers in the prior art.

SUMMARY

The present invention provides edible moisture barriers for food products. The edible moisture barriers are highly effective in preventing moisture migration within a multi-texture or a multi-component food product, such as between food components having different water activities and/or moisture contents at a given storage temperature. The edible moisture barriers of the invention are effective for providing a barrier with sufficient mechanical flexibility to resist cracking at reduced temperatures. The edible moisture barriers are organoleptically acceptable with various food types at temperatures more commonly associated with the food type at its point of consumption. The edible moisture barriers can be easily applied with commercial equipment. The edible moisture barriers are flexible and do not easily crack with handling or use or during storage.

The edible moisture barriers of the invention are structured glycerol ester ("SGE") compositions formulated with mixtures of short chain fatty acid residues ("S"; defined as a carbon chain having between 2 and 4 carbon atoms inclusive), medium chain fatty acid residues ("M"; defined as a carbon chain having between 6 and 12 carbon atoms inclusive), and saturated long chain fatty acid residues ("L"; defined as a saturated carbon chain having between 14 and 22 carbon atoms inclusive).

The edible barrier compositions of the present invention are reduced calorie, fully saturated, and are essentially free of trans fats. The lipid compositions of the invention generally deliver less bioavailable energy than fully bioavailable fat which delivers about 9.0 kcal per gram. Preferably, the lipid compositions of the invention generally deliver less than about 8 kcal/g, particularly less than about 7 kcal/g, and more particularly less than about 6 kcal/g of bioavailable energy. Preferably, the SGE compositions of the invention deliver about 5 to about 7 kcal/g.

The SGE compositions of the invention are generally formed by the base-catalyzed interesterification of triglycerides consisting of three molecules of fatty acids esterified to glycerol (with the formula $(CH_2OH)_2CHOH$). Triglycerides having short chain fatty acid residues (SSS) are reacted with triglycerides having medium chain fatty acid residues (MMM) and with triglycerides having saturated long chain fatty acid residues (LLL). Preferably, the triglycerides having short chain fatty acid residues are either derived from triacetin or blends of two or more sources selected from triacetin, tripropionin, and tributyrin. Preferably, the triglycerides having medium chain fatty acids are selected from caprylic, capric, and lauric acid and the triglycerides having saturated long chain fatty acids are selected from palmitic, stearic, arachidic and behenic, particularly palmitic and stearic acid, as would be found in fully hydrogenated vegetable oils.

The efficacy of the SGE compositions of the invention as moisture barriers appears to correlate with a ratio of solid to liquid components between about 1.2 to about 1.5 at a temperature of about 0 to about 5° C., total [SSL] triester content, and a major X-ray diffraction signal at 10° C. indicating alpha crystal morphology.

For purposes herein, the abbreviation "SML" is defined as including "SML" triacylglycerols, as well as its isomeric forms "SLM" and "MSL" triacylglyercols. In other words, "SML" is used herein as a shorthand notation for triacylglycerols having a short, a medium, and a long fatty acid residue, with the fatty acid residues arranged in no particular order. Also for purposes herein, the abbreviation "SSL" is defined as including "SSL" triacylglycerols, as well as its isomeric forms "SLS" and "LSS" triacylglycerols. In other words, "SSL" is used herein as a shorthand notation for triacylglycerols having two short and one long fatty acid residue, with the fatty acid residues appearing in no particular order.

It is particularly desired to select reactant molar ratios such that the final purified SGE composition contains 23 to about 70 percent SSL triacylglycerols, preferably about 44 to about 65 percent SSL triacylglycerols, more preferably about 40 to about 46 percent SSL triacylglyerols, and 6 to about 30 percent SML triglycerides, preferably about 17 to about 27 percent SML triacylglycerols, more preferably about 19 to about 23 percent SML triacylglycerols.

The SGE compositions of the invention have a molar ratio of [M]/[S] of about 0.1 to about 0.5 and a molar ratio of [S+M]/[L] of about 0.7 to about 2.0. Preferred SGE compositions have a molar ratio of [M]/[S] of about 0.15 to about 0.35 and a molar ratio of [S+M]/[L] is about 1.2 to about 1.8.

The present invention also provides a method for preventing moisture migration between food components having different moisture levels. In this aspect, the edible moisture barrier is particularly effective for use in multi-component and multi-texture foods having components with different water activities, with at least one component having an $A_w$ of greater than about 0.8. The edible moisture barrier of the invention has a low moisture permeability, good flexibility, and is easy to manufacture and can be used with a variety of food products. The edible moisture barrier is specially formulated for intended storage temperature of the food product and is effective for covering a food surface completely. The edible moisture barrier of the invention is sufficiently strong, stable, and non-brittle to form a surface that will resist cracking during handling and storage (at refrigeration and ambient temperatures) but is easily penetrated during consumption. The edible moisture barriers of the invention have organoleptic properties of taste, aftertaste, and mouthfeel that are essentially imperceptible such that the consumer is unaware of the presence of the barrier when the food product is consumed.

In an important aspect of the invention, the solid fat content (SFC) of the barrier is about 50 to about 80 percent, preferably about 55 to about 75 percent, most preferably about 60 to about 70 percent at about 0 to about 5° C. These characteristics provide a moisture barrier with a rapid and clean melt and a non-waxy mouthfeel when the protected food product is consumed at temperatures at or near ambient.

In this aspect, the edible moisture barrier is brought into contact with a food component in an amount effective for reducing moisture migration from one food component to another. Generally, the edible moisture barrier is applied to the food component to form an essentially continuous barrier layer at least about 25 microns thick, preferably about 50 microns to about 2 mm thick, more preferably about 100 to about 700 microns thick, and most preferably about 150 to about 300 microns thick.

The SGE compositions as described herein are therefore effective for increasing shelf life of a food product. The SGE compositions are suitable as edible moisture barriers and are effective for reducing moisture migration between food components to levels below 5 percent over about 50 days, more preferably to levels below 3 percent over about 50 days, and most preferably to levels below 1.5 percent over about 50 days, at refrigeration temperatures.

DESCRIPTION OF THE FIGURES

FIG. 1(a) shows the solid fat content for products from the interesterification of MMM, LLL, and SSS, where SSS is derived from triacetin (Series A). FIG. 1(b) shows the solid fat content for products from the interesterification of MMM, LLL, and SSS, where SSS is derived from a 1:1:1 blend of triacetin, tripropionin, and tributyrin (Series APB).

DETAILED DESCRIPTION

Figure 1A:
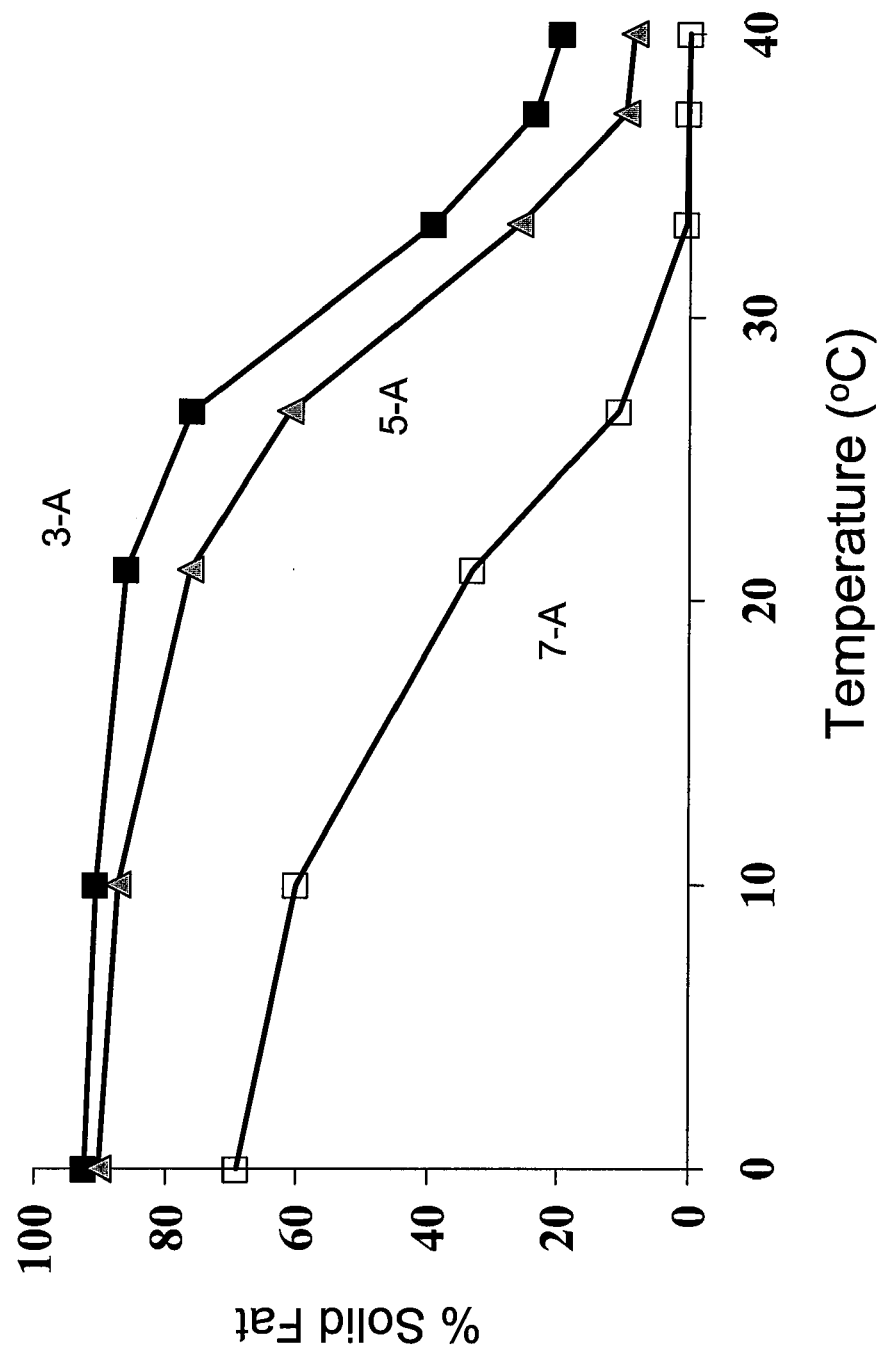
FIGS. 1(a)-1(b) show the solid fat content of the interesterification products of Example 1.

The edible moisture barriers of the invention have organoleptic properties of taste, aftertaste, and mouthfeel that are essentially imperceptible such that the consumer is unaware of the presence of the barrier when the food product is consumed. The edible moisture barriers of the invention comprise a family of reduced calorie, fully saturated, and trans-fat free structured glycerol ester (SGE) compositions. The moisture barrier is self-supported, thus eliminating the need for a base polymer network/film and the need for casting, coating or drying with a polymeric base layer. The moisture barriers of the invention also reduce undesirable texture defects, such as hardness or chewiness. The edible moisture barriers of the invention are rapid and clean melting, free from residues, and has a creamy (i.e., smooth), non-waxy mouthfeel.

The efficacy of the SGE compositions of the invention as moisture barriers appears to correlate with a ratio of solid to liquid components between about 1.2 to about 2.5 at a temperature between about 0 to about 5° C., total [SSL] triester content, and a major X-ray diffraction signal at 10° C. indicating alpha crystal morphology.

The SGE compositions of the invention give a major signal for alpha crystals under X-ray diffraction. Alpha crystal morphology has been associated with a rubbery texture in solid triacylglycerols. This particular attribute may be the dominant property that imparts superior efficacy for the SGE compositions defined herein as edible moisture barriers because these barriers are mechanically more flexible and less susceptible to micro and macroscopic fractures than other moisture barriers in the art. While not wishing to be limited by theory, it is believed that liquid oil fills the voids formed in aggregates of small crystals and therefore plugs channels otherwise available for water migration. While also not wishing to be limited by theory, it may also be that fats often tend to contract upon crystallization and the resulting strain in a highly crystalline material can result in fractures or fissures that permit moisture migration while liquid oils are able to modulate crystallization and reduce strain. In a significant aspect of the invention, the [SSL] triacylglycerols in the moisture barriers of the invention give rise to stable alpha crystal morphologies that do not significantly convert over time to other crystal forms, such as the beta and beta prime morphologies, at the storage temperature of the present food products.

The specific fat/oil (solid/liquid) ratio defined by solid fat content (SFC) is tailored and maintained for actual storage temperatures. Overall, this provides a stable, water resistant, nonporous moisture barrier such that the occurrence of cracking during cooling and storage may be minimized. Specific SFC is also designed for rapid melting at body temperatures to impart a pleasant or nondetectable mouthfeel and for ease of application by, for example, spraying, brushing, or enrobing.

Definitions

Unless defined otherwise, all technical and scientific terms used herein have the same meaning as commonly understood by one of ordinary skill in the art to which this invention belongs. All patents and publications referred to herein are incorporated by reference herein. For purposes of the present invention, the following terms are defined below.

As used herein, "reduced calorie" means a composition that delivers bioavailable energy in an amount less than that delivered by fully bioavailable fat at about 9.0 kcal per gram. Preferably, the lipid compositions of the invention generally deliver less than about 8 kcal/g, particularly less than about 7 kcal/g, and more particularly less than about 6 kcal/g of bioavailable energy. Preferably, the SGE compositions of the invention deliver about 5 to about 7 kcal/g.

As used herein, "edible" material includes any material that is generally regarded as safe by the FDA and does not have to be removed from the food component before it is eaten (i.e., a material that can be safely chewed and ingested by the consumer).

As used herein, "barrier" or "moisture barrier" is understood to describe a thin continuous structure or layer that is essentially impermeable to moisture migration through it, and which coats an inner or outer surface of a food product. The barrier may be described as a coating, film, or membrane. The barrier can be placed between components having differing water activities within the food product to prevent or significantly reduce moisture migration between the components or on the outer surface of the food product to prevent or significantly reduce moisture migration between the food product and the ambient environment. The moisture barrier of this invention is designed to be used in direct contact with moist foods and to be effective against moisture migration through vapor equilibrium and/or liquid diffusion. For purposes of this invention, in the case of preventing moisture migration between the food product and the ambient environment, the first food component would be considered to be one or more outer surfaces of the food product and the second food component would be considered to be the ambient environment.

As used herein, "water activity" ($A_w$) is the ratio of vapor pressure of water in the food of interest and vapor pressure of pure water at the same temperature.

"Fat/Oil ratio" or "solid fat content" ("SFC") is commonly used to describe a physical condition of lipids at specific temperatures. Fat is solid at a given temperature, whereas oil is liquid. The fat/oil ratio of a given lipid is not a constant but is a function of temperature. For example, butter can be regarded as mainly solid fat (about 70 percent solid fat) at 0° C. and becomes plastic (about 15 percent solid fat) at room temperature and completely liquid oil (0 percent solid fat) above 40° C. Therefore, it is possible to tailor a blend of triglycerides that has a desired fat/oil ratio at a given temperature as well as different degrees of melting over specific temperature ranges of interest. It goes without saying that all edible oils will ultimately be fully melted and devoid of fat solids at sufficiently elevated temperatures. When a lipid-based fat crystal control agent is used in the composition, such agent itself is also often lipid, hence, the actual SFC of a barrier must include the fat and oil fractions from the fat crystal control agent. Fat/oil ratio in a barrier varies with temperature and is important to barrier effectiveness and stability at actual storage temperature (e.g., about 0 to about 5° C. for refrigerated storage or about 15 to about 25° C. for ambient storage) of food product. The fat/oil ratio is also important for mouthfeel/sensory acceptability at 25 to 37° C. and for ease of application at the temperature (typically >40° C.) for transport or application (e.g., spraying).

"Barrier effectiveness" was evaluated analytically by experimental protocol referred to as a cheese-cup method. A control was prepared by using a water impermeable plastic cup packed with commercial process cheese ($A_w$=0.98) and placed in a constant humidity chamber over saturated magnesium chloride solution with an equilibrium relative humidity of about 33 percent at about 20° C. Moisture or weight loss is monitored over a ten week period as a reference point for the comparison of barrier effectiveness. Too short of a storage time often gives unreliable results that cannot be extrapolated to longer term (for example four months) storage performance. Similarly prepared cheese-cups coated with selected barrier composition with a thickness of about 1.0 to about 1.6 mm were compared to control under identical condition in terms of "percent moisture loss" versus storage time. An average of at least four replicates is required and used for comparison purpose. This method simulates more closely the actual product application conditions in which the barrier is in direct contact with a moist food component.

Structured Glycerol Ester Compositions

Component triglycerides making up the compositions of the invention can be, and preferably are, prepared using synthetic procedures. Also provided herein are methods for synthesizing such new lipids having desirable properties. This process is sometimes referred to as structuring lipids and the products are referred to as structured lipids or structured glycerol esters (SGE's). Structured lipids are synthetic acylglycerols, in this case triacylglycerols, containing fatty acids esterified to a glycerol moiety. Alternatively, the structured lipid is a phosphoglyceride having one or more fatty acids esterified to a hydroxyl group of the phosphoglyceride. Both chemical and enzymatic processes, namely direct esterification, acidolysis, and ester-ester interchange reactions can be used to synthesize or re-structure lipids as provided herein.

The SGE compositions of the present invention are prepared using synthetic procedures known to those skilled in the art, such as by interesterification. In the present method, the reactants include triglycerides having short chain fatty acids (SSS), triglycerides having medium chain fatty acids (MMM), and triglycerides having long chain fatty acids (LLL), wherein the starting triglycerides have the following formulas:

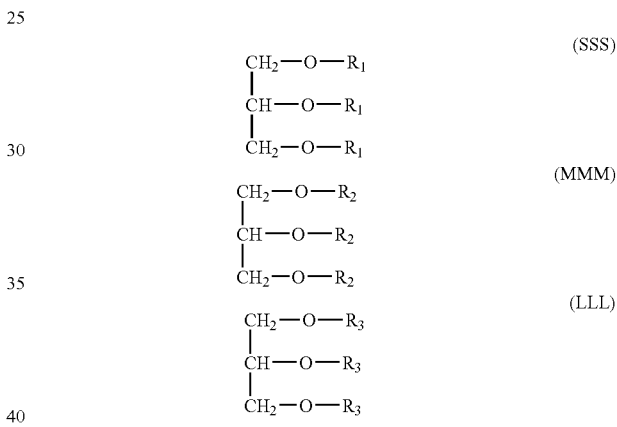

where each $R_1$ group is a short ("S") chain aliphatic group having two to four carbons, where each $R_2$ group is a medium ("M") chain aliphatic group having six to twelve carbons, and each $R_3$ group is a saturated long ("L") chain aliphatic group having fourteen to twenty-two carbons.

Short acid residues preferably have no more than 4 carbons. Suitable short chain groups are derived from triacetin, tripropionin, tributyrin, and mixtures thereof. Generally, preferred short chain moieties are derived from either triacetin, blends of any two of triacetin, tripropionin and tributyrin, or a blend of all three short chain triacylglycerols. Any blend of triacetin, tripropionin, and tributyrin may be used, including but not limited to a 1:1:1 ratio of triacetin, tripropionin, and tributyrin.

Short residues are derived from carboxylic acids of the formula $S_1COOH$, where $S_1$ is a short chain aliphatic group having 1 to 3 carbons. Acylation of a glycerol hydroxyl by acid $S_1COOH$ results in the attachment of $S_1$ to the glycerol backbone by means of an ester linkage (—O—(CO)—) to form short chain "S" groups. As used herein, the term "acid residue" refers to an acyl group, here short chain S.

Medium (M) residues have 6 to 12 carbons. Medium groups are derived from any synthetic or natural organic medium chain fatty acid of the formula $M_1COOH$, where $M_1$ is a medium chain aliphatic group having five to eleven carbons. These include, but are not limited to, caproic (C6:0), caprylic (C8:0), capric (C10:0) and lauric (C12:0) acids. Particularly preferred medium chain moieties are derived from caprylic (C8:0) and capric (C10:0) acids. The medium fatty acid residues are fully saturated. Acylation of a glycerol hydroxyl by acid $M_1COOH$ results in the attachment of $M_1$ to the glycerol backbone by means of an ester linkage to form medium chain "M" groups.

Long chain (L) groups have 14 to 22 carbons. Long chain groups are derived from saturated acids of the formula $L_1COOH$, where $L_1$ is a C15 to C19 saturated group. These include, but are not limited to, palmitic (C16:0) and stearic (C18:0) acids, as would be encountered in fully hydrogenated vegetable oils. It should be recognized that fully hydrogenated vegetable oils contain no unsaturated fatty acid moieties and therefore contain no trans-fatty acid components. Acylation of a glycerol hydroxyl by acid $L_1COOH$ results in the attachment of $L_1$ to the glycerol backbone by means of an ester linkage to form long chain "L" groups.

Interesterification reactions are utilized to rearrange the fatty acid residues within and between the triglycerides, thus altering the physical and nutritional properties of the resulting products. The interesterification reaction is carried out for such time and under such conditions that triglycerides having the desired combinations of fatty acid residues are produced. Procedures for interesterification are well known to those skilled in the art. See, e.g., U.S. Pat. No. 5,380,544 (Mar. 5, 1993), U.S. Pat. No. 5,662,953 (Sep. 2, 1997), and U.S. Pat. No. 6,277,432 (Aug. 21, 2001), which are incorporated herein by reference. Interesterification reactions may be catalyzed by chemical or enzymatic means. Generally, strong bases, such as sodium methoxide or sodium-potassium alloy or potassium ethoxide, and the like, are used to catalyze the interesterification reaction.

The edible moisture barrier compositions of the invention include a mixture of structured lipid compositions that comprise glycerol esters having the general formula (A):

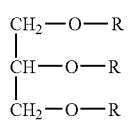

(A)

where each R group independently represents a short fatty acid residue "S," a medium fatty acid residue "M," or a saturated long fatty acid residue "L." The SGE compositions of this invention may contain three of the same or different aliphatic R groups attached to a glycerol molecule. A mixture of triglycerides with the following combinations of fatty acids may be produced: MSS, SMS, MMS, MSM, LSS, SLS, LLS, LSL, SML, MSL, SLM, MML, MLM, MLL, and LML. It was determined that increasing the short chain acid diversity by using a blend of triacetin, tripropionin, and tributyrin as reactants versus using only triacetin increased the total number of different triacylglycerols produced.

For purposes herein, the abbreviation "SML" is defined as including "SML" triacylglycerols, as well as its isomeric forms "SLM" and "MSL" triacylglyercols. In other words, "SML" is used herein as a shorthand notation for triacylglycerols having a short, a medium, and a long fatty acid residue, with the fatty acid residues arranged in no particular order. Also for purposes herein, the abbreviation "SSL" is defined as including "SSL" triacylglycerols, as well as its isomeric forms "SLS" and "LSS" triacylglycerols. In other words, "SSL" is used herein as a shorthand notation for triacylglycerols having two short and one long fatty acid residue, with the fatty acid residues appearing in no particular order.

It is particularly desired to select reactant molar ratios that maximize the production of a mixture of triglycerides with the desired fatty acid compositions with effective moisture barrier properties. In an important aspect of the invention, barrier performance is believed to be associated with the SSL and SML content of the SGE compositions. The SSL triglycerides exist in stable alpha-crystal morphologies while the SML triglycerides remain substantially liquid below ambient temperature. As the SSL triglycerides are solids below ambient temperature, the SSL triglycerides provide the major source of solid triglycerides in the SGE compositions of the invention at ambient temperature. The content of liquid SML and solid SSL triglycerides are important for moisture barrier efficacy, as is the particular stable alpha-crystal morphology of the SSL triglycerides.

It is preferred that purification techniques that reduce less desirable triglyceride species be employed, for example, to substantially remove low molecular weight triglycerides that provide off flavors, such as SSS, SSM, SMM, and MMM triglycerides. Such purification techniques include steam deodorization, fractional distillation, molecular distillation (also referred to as thin film evaporation), and wiped film distillation. Steam deodorization under vacuum at relatively high temperatures, e.g., from about 210 to about 260° C. may be used to remove SSS, SSM, SMM, and MMM species that are formed in the reaction while not significantly depleting the composition of the more desired SSL and SML components. Other purification techniques, such as decolorization, may be employed if desired.

Thus, it is particularly desired to select reactant molar ratios such that the final purified SGE composition contains 23 to about 70 weight percent SSL triacylglycerols, preferably about 44 to about 65 percent SSL triacylglycerols, more preferably 40 to about 46 percent SSL triacylglyerols, and 6 to about 30 weight percent SML triglycerides, preferably about 17 to about 27 percent SML triacylglycerols, more preferably about 19 to about 23 percent SML triacylglycerols.

The SGE compositions of the invention are characterized by X-ray diffraction signals at 10° C. for alpha crystal morphology which are effectively stable with recrystallization. While virtually all fats initially crystallize in an alpha crystal habit, this crystal form is often lost by recrystallization to more stable beta and beta prime morphologies. However, for the SGE compositions described herein as highly efficacious edible moisture barriers, the more preferred SSL triacylglycerols give rise to stable alpha crystal morphologies that do not convert over time to other crystal forms. A characterizing feature of the powder X-ray diffraction pattern for the SSL triacylglycerols herein described is a major peak between 21.0-22.8 2Θ (this is the so-called short spacing that transform via the Bragg equation to 3.96-4.25 Angstroms or 0.396-0.425 nanometers). The SGE compositions of the invention crystallize in the alpha crystalline phase, which is characterized by small crystallite size. Subsequent melting and cooling cycles restore the alpha crystal morphology and reestablish moisture barrier effectiveness with minimal deterioration of moisture barrier performance. The alpha crystalline state also produces a flexible, rubbery solid material that is highly resistant to fracture when the moisture barrier is subjected to distortion, impact, or freeze/thaw cycles such as those modeled by the cheese-cup method employed here to assess moisture barrier efficacy.

The solid fat content (SFC) of the SGE compositions of the invention is determined by low resolution, pulsed nuclear magnetic resonance (NMR) spectroscopy as a function of temperature. Moisture barrier efficacy of the SGE compositions of the invention appears to correlate with a ratio of solid to liquid components between about 1.2 to about 2.5 between about 0 to about 5° C. In an important aspect of the invention, the SFC of the barrier is about 50 to about 80 percent, preferably about 55 to about 75 percent, and most preferably about 60 to about 70 percent, at about 0 to about 5° C. The SGE compositions of the invention have a solid fat content of less than 5 percent above about 37° C. Preferably, the SGE compositions of the invention have a solid fat content of less than 2 weight percent above 37° C. These characteristics provide a moisture barrier with a rapid and clean melt and a non-waxy mouthfeel.

The preferred edible barrier compositions of the invention should also have a molar ratio of [M]/[S] of about 0.1 to about 0.5 and a molar ratio of [S+M]/[L] of about 0.7 to about 2.0. More preferably, the SGE compositions have a molar ratio of [M]/[S] of about 0.15 to about 0.35 and a molar ratio of [S+M]/[L] of about 1.2 to about 1.8.

Significantly, the SGE compositions of the present invention have reduced caloric value as compared to conventional fats and oils. The lipid compositions of the invention generally deliver less bioavailable energy than fully bioavailable fat which delivers about 9.0 kcal per gram. Preferably, the lipid compositions of the invention generally deliver less than about 8 kcal/g, particularly less than about 7 kcal/g, and more particularly less than about 6 kcal/g of bioavailable energy. Preferably, the SGE compositions of the invention deliver about 5 to about 7 kcal/g.

The novel SGE compositions of the present invention are preferably trans-fatty acid free (i.e., contain essentially no acyl groups containing trans unsaturation).

Application of Edible Barrier Compositions

The SGE compositions of the invention are relatively low-melting, low viscosity fluids. As a result, the SGE compositions can be conveniently applied in liquid state to a food surface to give a homogenous, coherent coating of minimum effective thickness. Generally, the edible moisture barrier is applied to the food component to form an essentially continuous barrier layer at least about 25 microns thick, preferably about 50 microns to about 2 mm thick, more preferably about 100 to about 700 microns thick, and even more preferably about 150 to about 300 microns.

To apply the barrier to a food product, the SGE composition is heated to achieve a complete melt to about 25 to about 60° C. The moisture barrier composition will have a viscosity of about 10 to about 300 cps at a temperature of about 25 to about 60° C. Where inhibition of moisture migration between a food product and the ambient environment is desired, the moisture barrier composition can be applied to one or more of the outer surfaces of the food product and allowed to cool.

In one practice of the invention, the barrier is applied by immersing the food product, or simply the surface thereof to be coated, into a melted or molten SGE composition, removing the food product, and allowing the coated product to cool. In another practice of the invention, the molten film is applied by brushing or otherwise applying the SGE composition to the desired surface(s) of the product. Suitable techniques for applying the barrier include, for example, spraying, dipping, pan coating, enrobing, deposition, extrusion, use of a fluidized bed, and the like. In still another practice, the film can be applied using a spray, including atomized spray, air-brushing, and the like.

The SGE compositions as described herein are therefore effective for increasing shelf life of a food product. The SGE compositions are suitable as edible moisture barriers and are effective for reducing moisture migration between food components to levels below 5 percent over about 50 days, more preferably to levels below 3 percent over about 50 days, and most preferably to levels below 1.5 percent over about 50 days, at refrigeration temperatures.

The following examples illustrate methods for carrying out the invention and should be understood to be illustrative of, but not limiting upon, the scope of the invention which is defined in the appended claims.

EXAMPLES

Example 1

Six different structured glycerol ester compositions were prepared via base catalyzed interestification using six different combinations of triacylglycerols reactants bearing "MMM," "LLL," and "SSS" fatty acid residues, as defined in Table 1 below, as reactants.

TABLE 1

Reactants

| | Identity of Reactants |
|---|---|
| "SSS" | Series "A": Triacetin |
| | Series "APB": 1:1:1 equi-molar blend of triacetin, tripropionin, and tributyrin |
| "MMM" | NEOBEE ® M-5 (Stepan Co. (Northfield, IL)) |
| | (~70% C8:0, ~30% C10:0) |
| "LLL" | Fully hydrogenated soybean oil in flake form |
| | (Fuji Oil Co., Ltd.) |
| | (~11% C16:0, ~89% C18:0) |

To produce the structured lipids, a mixture of triacylglycerols bearing "SSS," "MMM," and "LLL" fatty acid constituents were combined in the ratios defined in Table 2 below. The reactants were heated to 100-150° C. under vacuum to remove traces of water and randomly interesterified in the presence of about 0.1 weight percent anhydrous sodium methoxide to initiate the randomization reaction. After 30-60 minutes, the reaction mixture was cooled and quenched with about 5 weight percent water. Bleaching clay (about 0.5 weight percent) and citric acid (1000 ppm) were added and the mixture was heated to 100° C. under vacuum for 30-60 minutes to decolorize the mixture and precipitate sodium fatty acid soaps. The bleaching clay was removed by vacuum filtration, and each composition was vacuum steam deodorized (210-260° C.) to volatize and remove excess SSS, SSM, SMM, and MMM triacylglycerols. The compositions of the resultant mixtures are summarized in Table 2 below.

TABLE 2

Molar Ratios of Short, Medium and Saturated Long Chain Acids in Reactants and Products

| | Molar Ratios of Reactants | | |
|---|---|---|---|
| Sample No. | SSS* | MMM | LLL |
| 3A | 5.7778 | 0.7222 | 6.5000 |
| 5A | 8.3572 | 1.3929 | 3.2500 |
| 7A | 8.6666 | 2.1667 | 2.1667 |
| 3APB | 5.7778 | 0.7222 | 6.5000 |
| 5APB | 8.3572 | 1.3929 | 3.2500 |
| 7APB | 8.6666 | 2.1667 | 2.1667 |

Figure 1B:
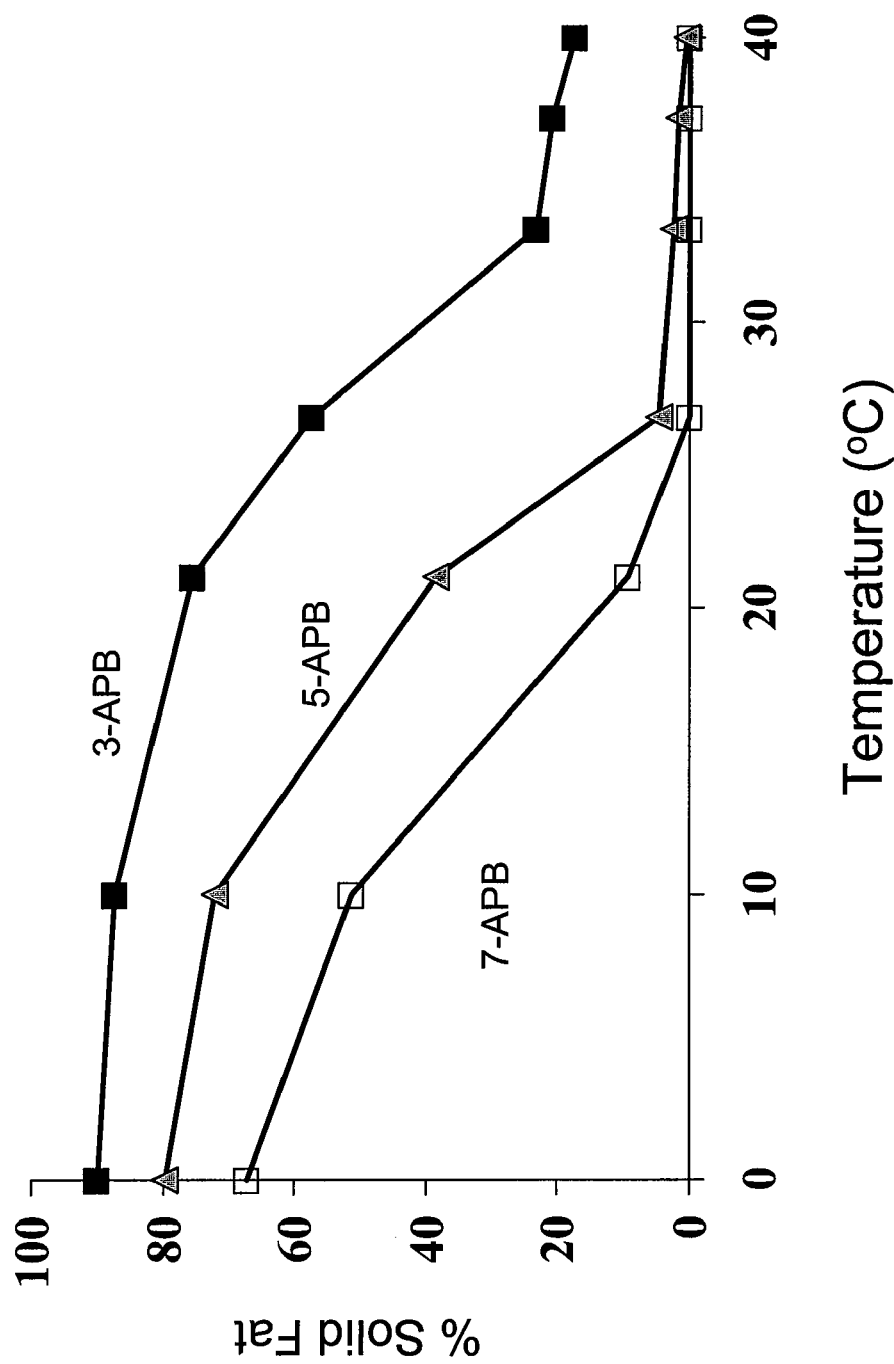
Figures 1, 2A:
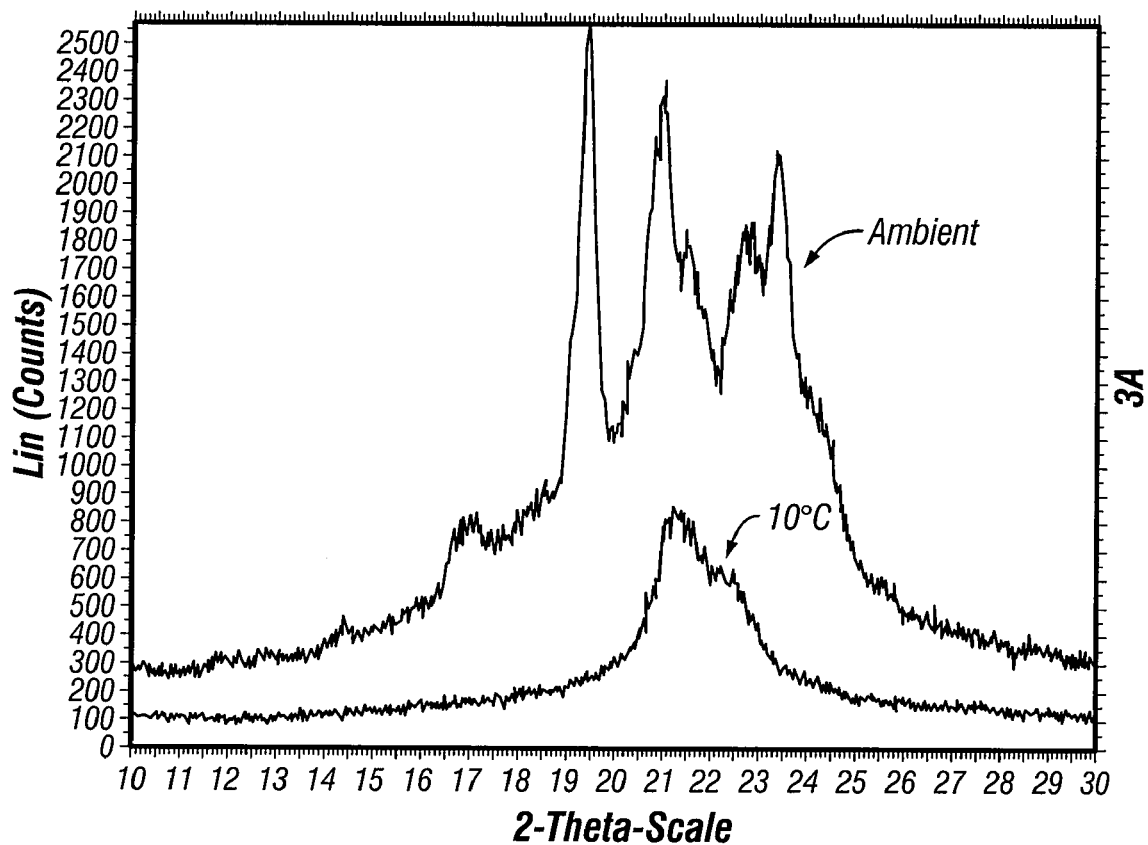
FIG. 2(a)-(c) shows the X-ray powder diffraction pattern for each product from the interesterification of MMM, LLL, and SSS, where SSS is derived from triacetin (Series A) or the interesterification of MMM, LLL, and SSS, wherein SSS is derived from a 1:1:1 blend of triacetin, tripropionin, and tributyrin (Series APB) described in Example 1 at ambient temperature and 10° C.
Figures 2, 2A:
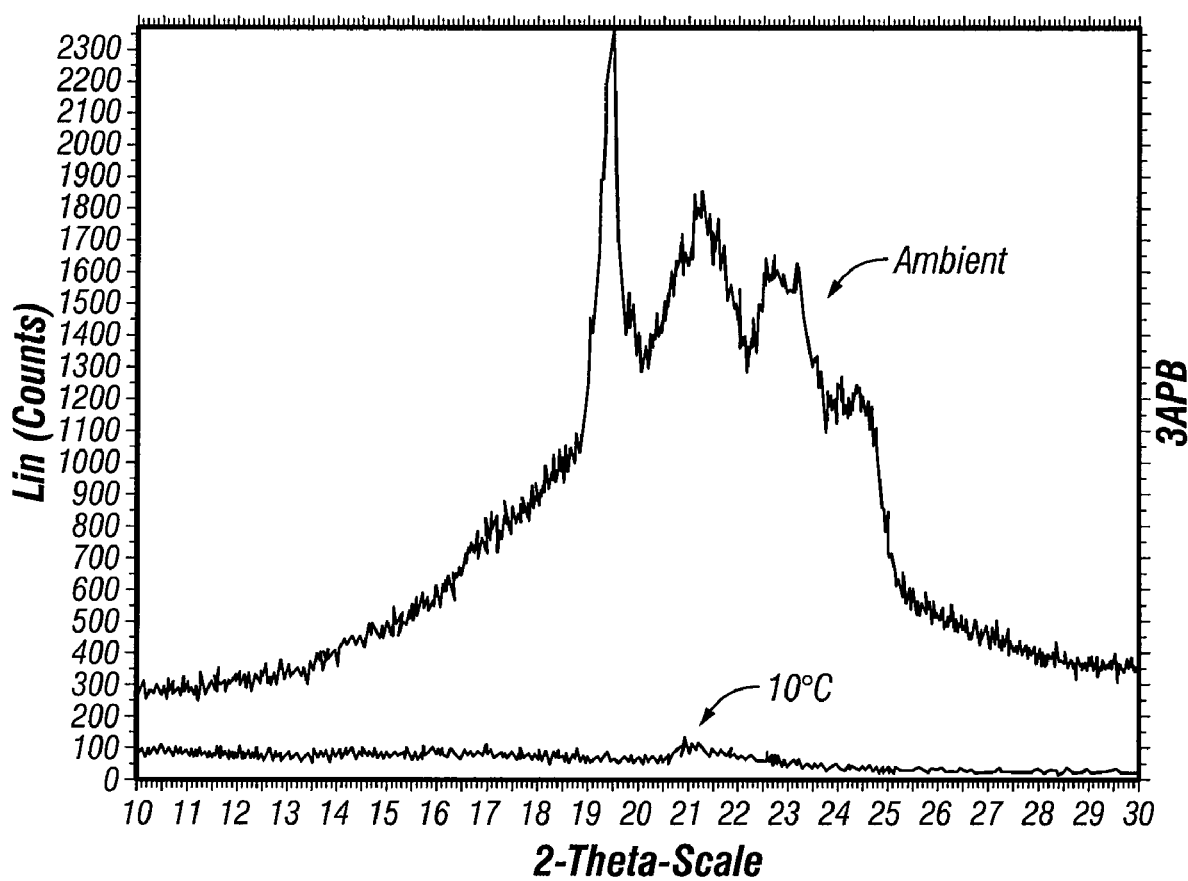
Figures 1, 2B:
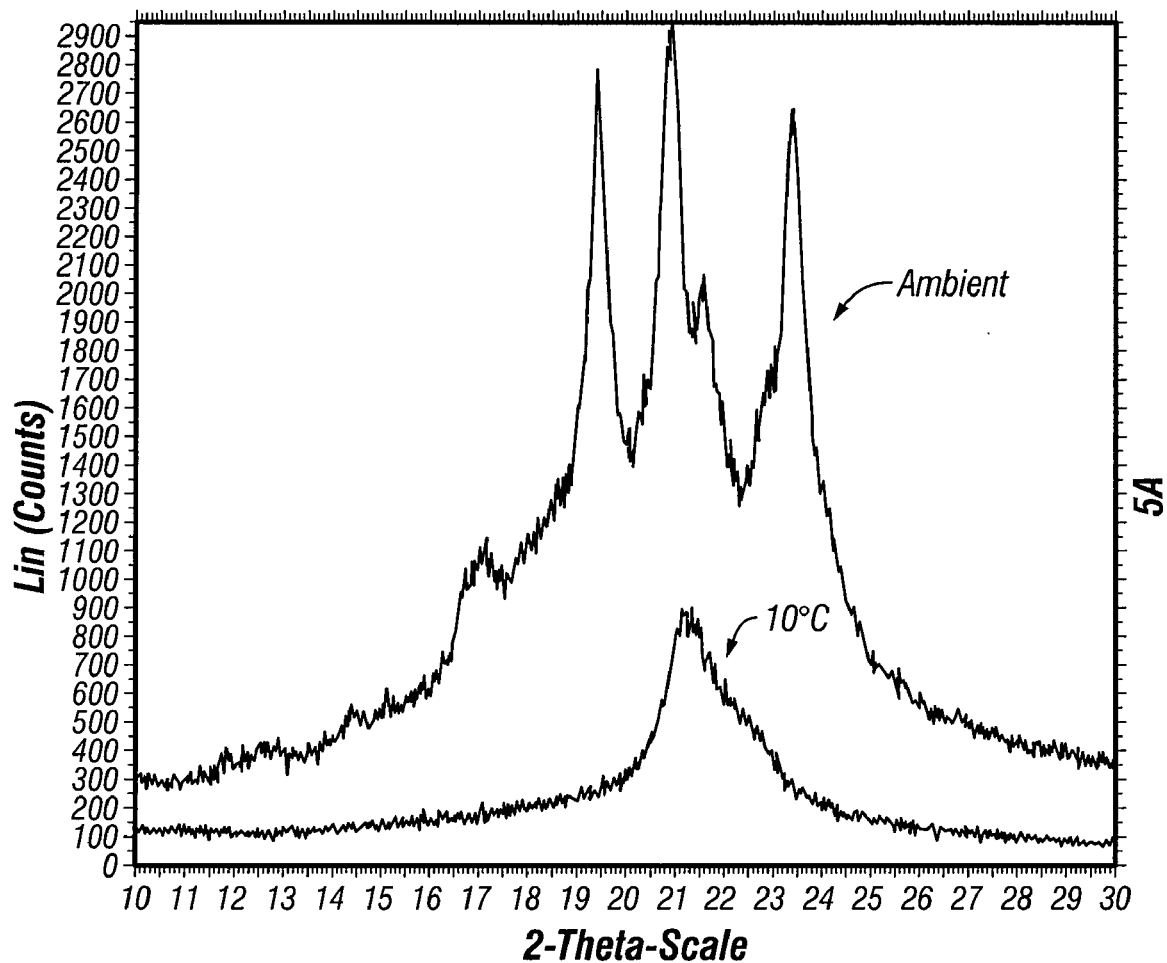
Figures 2, 2B:
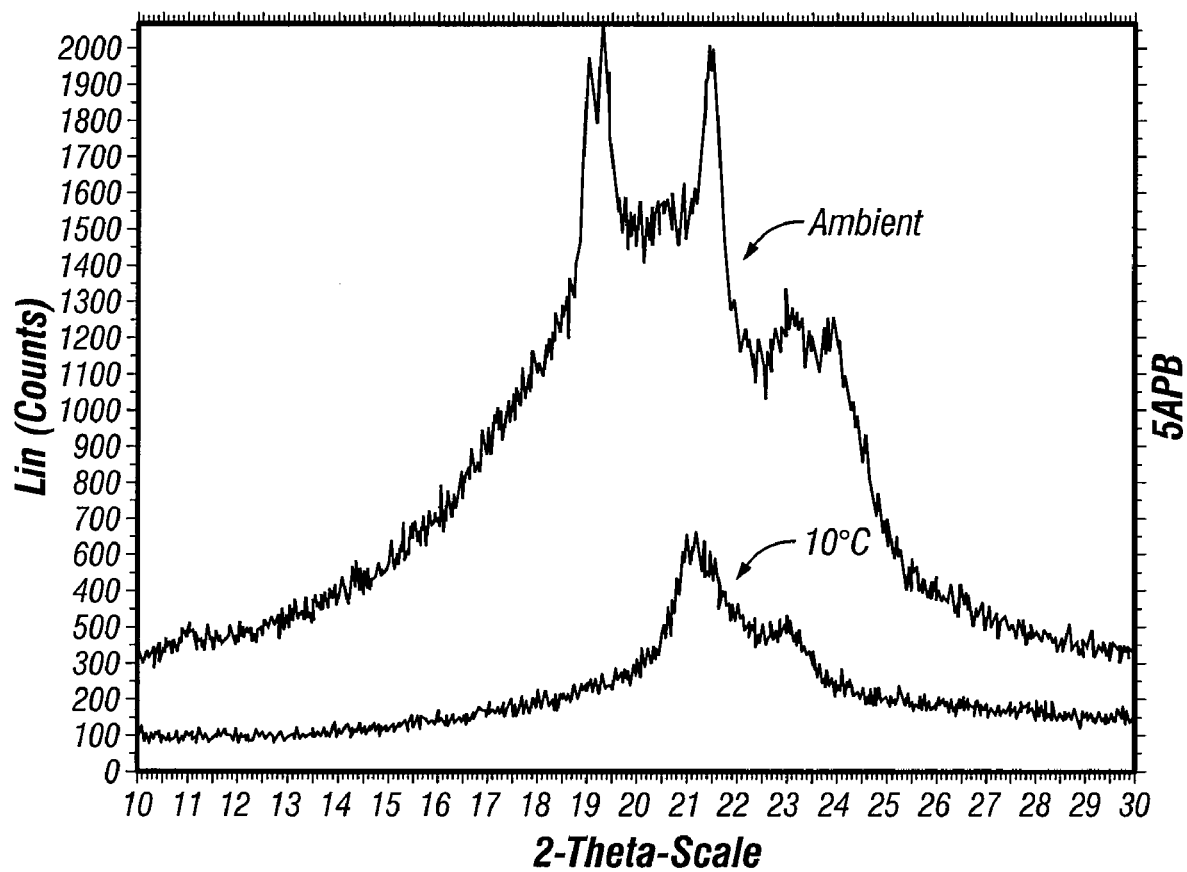
Figures 1, 2C:
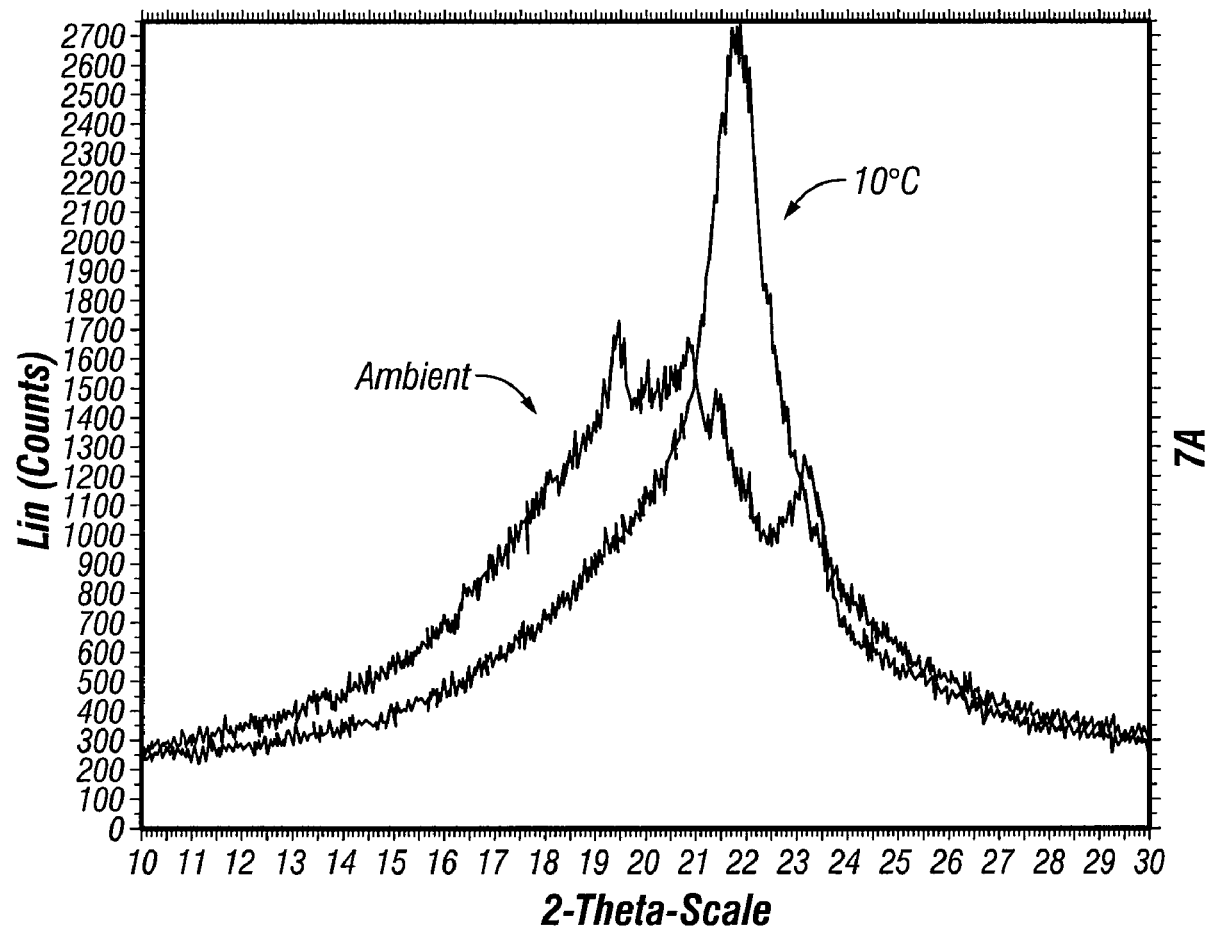
Figures 2, 2C:
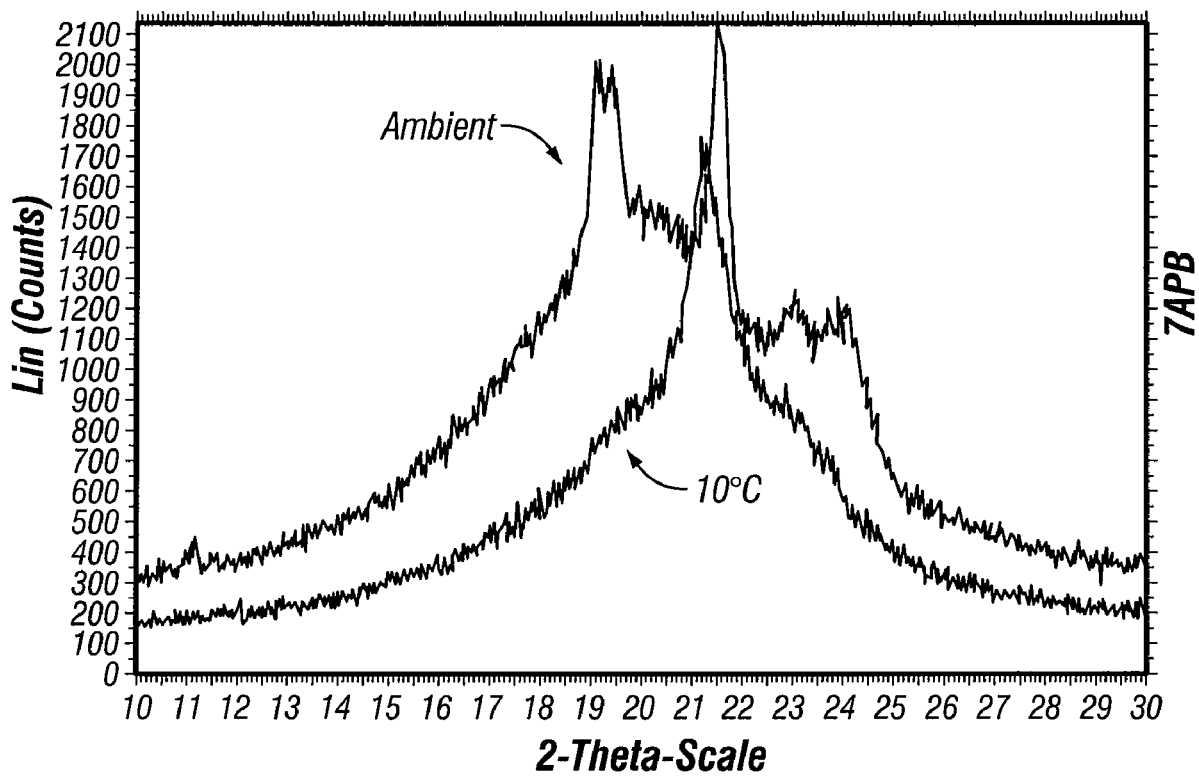

*Series "A" is triacetin; Series "APB" is a 1:1:1 equi-molar blend of triacetin, tripropionin, and tributyrin The final SGE compositions were solids at ambient temperature. The solid fat content of each sample was determined as a function of temperature. The results are shown in FIG. 1a and FIG. 1b. The X-ray powder diffraction pattern for each composition was also determined at room temperature and at 10° C. (slightly above common refrigerator temperature). The results are shown in FIGS. 2a-c and Table 3 below. As shown in FIG. 2c, samples 7A and 7APB gave the strongest signals for alpha crystals at 10° C.

Figure 3:
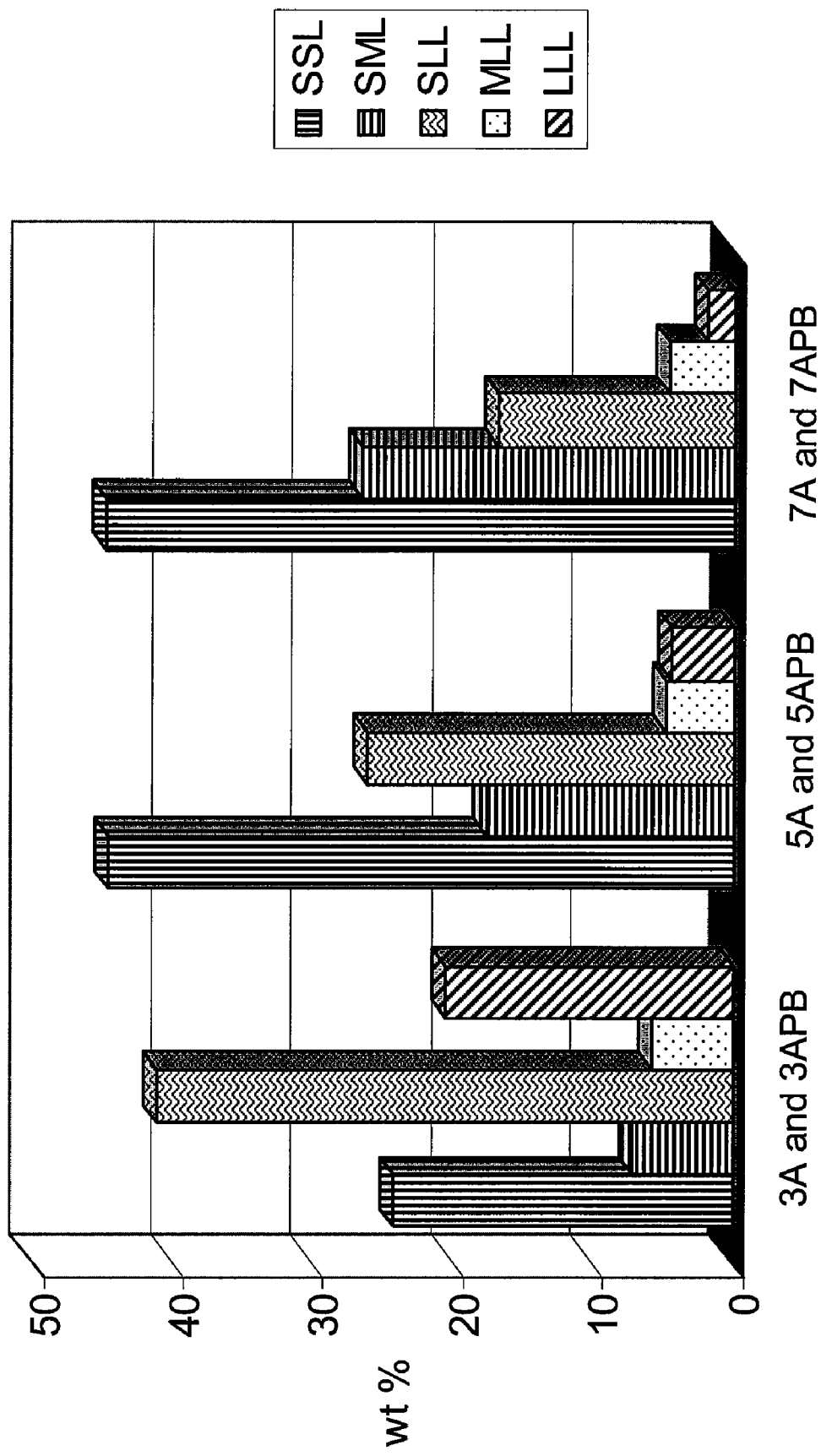
FIG. 3 shows the triacylglycerol profiles of the SGE compositions prepared in Example 1.

The samples were further characterized by high temperature capillary gas chromatography (HTCGC) to give profiles of the triacylglycerol types in each SGE composition. This data was used to calculate the molar ratios of fatty acid residue types, and the results are presented in Table 3 below and in FIG. 3.

cylglycerols. Sample 7A includes about 26.7 percent SML triacylglycerols. Suitable barriers can be obtained by reducing the SML content, such as by lowering the concentration to about 24 percent, and compensating with incorporation of the diversity of the Series "APB" components. Incorporation of the "APB" diversity shifts the solid-liquid composition to slightly more liquid.

In comparison, sample 5APB had similar amounts of alpha-tending SSL triacylglycerols but lower SML content (~17.7%) and smaller liquid fraction (~22%). Sample 5A had an even lower liquid fraction (~10%) than sample 5APB. Here, the "APB" diversity is not sufficient to compensate for the decrease of the SML content down to 17.7%. Samples 5A and 5APB were less effective moisture barriers than samples 7A and 7APB.

TABLE 3

Properties and Content of Products

| Sample No. | Solid Fraction at 0-5° C. | Liquid Fraction at 0-5° C. | Alpha Peak Area | [SML] (%) | Alpha-tending [SSL] (%) | [M]/[S] | [S + M]/[L] |
|---|---|---|---|---|---|---|---|
| 3A | 92% | 8% | Obs* | 7.25 | 24.4 | 0.112 | 0.745 |
| 5A | 90% | 10% | Obs* | 17.7 | 44.7 | 0.170 | 1.314 |
| 7A | 65% | 35% | 36.5 | 26.7 | 44.9 | 0.283 | 1.577 |
| 3APB | 90% | 10% | 0 | 7.25 | 24.4 | 0.159 | 0.662 |
| 5APB | 78% | 22% | 9.6 | 17.7 | 44.7 | 0.184 | 1.355 |
| 7APB | 59% | 41% | 28.1 | 26.7 | 44.9 | 0.325 | 1.685 |

*Peak area could not be measured due to overlapping peaks although it is believed that each sample contains some quantity of alpha crystals.

Moisture Barrier Effectiveness

Commercial process cheese ($A_w$=0.98) was placed in a plastic cup. A portion of each of the SGE materials prepared above were melted and applied to an exposed surface of process cheese contained in a plastic (4 cm diameter) AQUALAB sample cup with a brush to form a thin film (~1.6 grams of barrier lipid provides a film with a thickness of about 1.45 mm) on the top surface of the process cheese. The control composition was a blend of palm kernel oil, canola oil and polyglycerol monostearate as described in U.S. Publication No. 2004/0101601A1 to Loh et al., which is incorporated by reference herein. The individual cups were weighed and cooled to 20° C. and placed in a desiccator. The relative humidity of the desiccator was maintained at 33 percent by means of a saturated solution of $MgCl_2$. The desiccator and its contents were placed in a walk-in cooler (5° C.). Periodically, the desiccator was opened and the cups were weighed and replaced in the dessicator.

Figure 4:
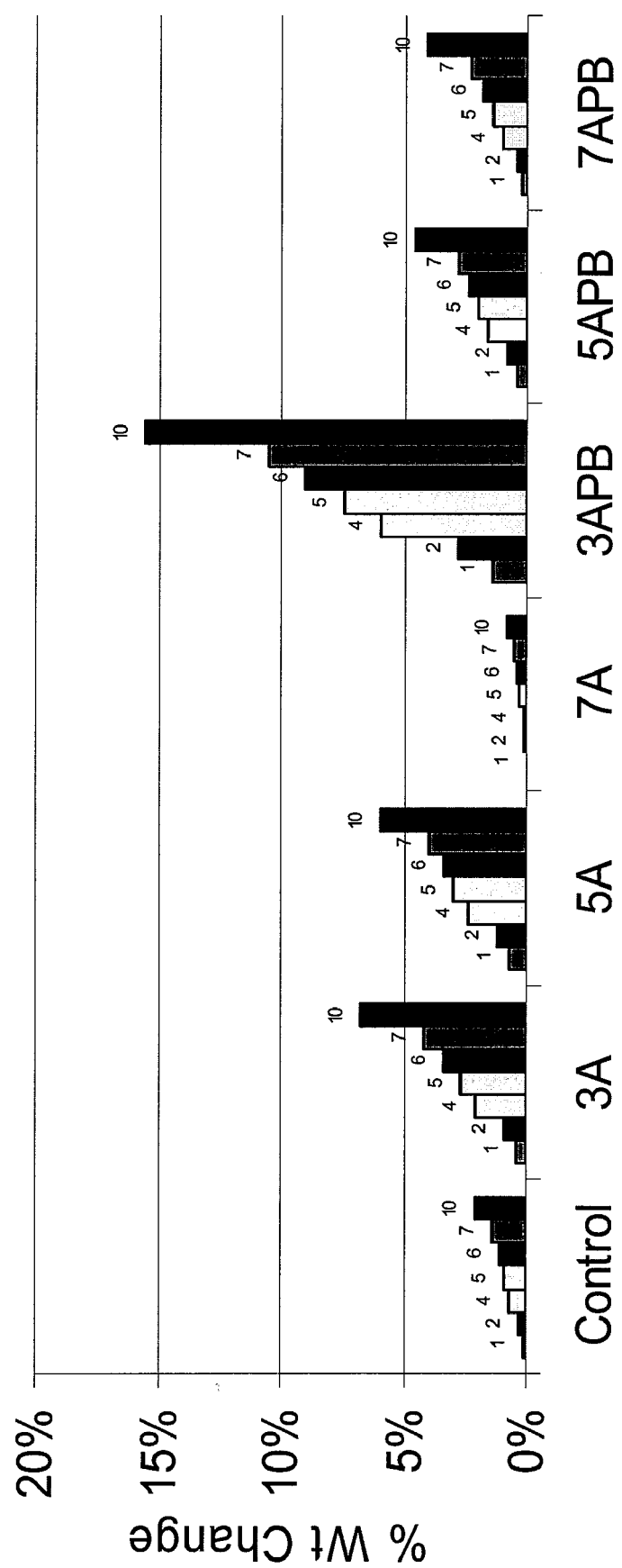
FIG. 4 shows the moisture barrier performance of the SGE compositions described in Example 1 as measured at 1 week, 2 weeks, 4 weeks, 5 weeks, 6 weeks, 7 weeks, and 10 weeks.

The moisture loss was determined by weight loss of the sample cups monitored over time. As can be seen in FIG. 4, the moisture loss through the SGE compositions of Example 1 was greatest for sample 3APB and lowest for sample 7A.

As can be seen from this data, sample 7A had the highest SML and alpha crystal-tending SSL content and was the most effective moisture barrier. While sample 7APB had the same SML and SSL content as sample 7A, sample 7APB had a smaller alpha-crystal signal and greater liquid fraction (41% compared to 35%). It is believed that the greater liquid fraction of sample 7APB is due to the greater diversity of the acetic-propionic-butyric composition, which gives rise to less total solids and slightly less effective moisture barriers.

Sample 7A demonstrates that it is preferable to have around 35 percent liquid fraction (as in sample 7A) and that it is preferable to derive the liquid fraction from the SML tria- Samples 3A and 3APB had the lowest amount of alpha-tending SSL triacylglycerols, as well as the lowest content of SML triacylglycerols. Samples 3A and 3APB had two of the largest solid fractions of all the samples (92% and 90%, respectively). While not wishing to be bound by theory, it is believed that maximum fat solids produce less effective moisture barriers because some liquid oil is needed to fill the voids, thus plugging the channels for moisture migration. As a result, samples 3A and 3APB were the least effective moisture barriers.

Example 2

Interesterification reactions were carried out on four blends of short (SSS), medium (MMM) and saturated long (LLL) chain triacylglycerols using essentially the same procedure as described in Example 1. The relative molar ratios of these reactants and various properties of the resulting products are given in Table 4 below.

TABLE 4

Molar Ratios of Short, Medium and Saturated Long Chain Acids in Reactants and Products

| | Molar Ratios of Reactants | | | Products | | | |
|---|---|---|---|---|---|---|---|
| NO. | SSS* | MMM | LLL | T deod. (° C.) | [M]/[S] | [S + M]/L | kcal/g |
| 1 | 5.7 | 6.3 | 1.0 | 210 | 2.55 | 4.68 | 8.77 |
| 2 | 5.7 | 6.3 | 1.0 | 260 | 3.77 | 2.93 | 7.60 |
| 3 | 9.7 | 2.3 | 1.0 | 210 | 0.62 | 1.61 | 6.11 |
| 4 | 8.6 | 3.4 | 1.0 | 210 | 1.01 | 2.20 | 6.49 |

*Triacetin

After refining and vacuum steam deodorization, each of the SGE materials was assayed for caloric bioavailability in an animal feeding study. The study employed young (~100 g) rats randomly assigned in groups of ten each to different diets. A baseline group received excess food, and the amounts consumed each day were recorded. A restricted group was started on a one-day delay. The restricted group received one-half of the rations consumed by the baseline group. Body weights were determined daily and were averaged for each group. Five additional groups were started at the same time as the restricted group, and these groups received the restricted ration supplemented with 10 percent corn oil or one of the four SGE test materials. These animals were also weighed daily, and their average weight was recorded. All groups showed a linear pattern of growth over the fourteen day study. At the conclusion of the study, the weight gain for the corn oil group can be correlated with the caloric content (9 kcal/gram) of corn oil. The decreased body weights of the groups that received diets augmented with the SGE compositions can be correlated with the reduced caloric bioavailability for these materials. The caloric bioavailabilities determined for the SGE samples are shown above in Table 4. This example shows that SGE compositions containing short, medium, and saturated long chain acids are reduced calorie fats.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. An edible moisture barrier composition comprising a mixture of structured glycerol ester compositions having the general formula (A):

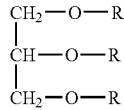

(A)

where each R group independently represents a short fatty acid residue "S" of 2 to 4 carbons, a medium fatty acid residue "M" having 6 to 12 carbons, or a saturated long fatty acid residue "L" having 14 to 22 carbons, the mixture comprising about 23 to about 70 percent SSL triacylglycerols and about 6 to about 30 percent SML triacylglycerols, and wherein the molar ratio of [M]/[S] residues in the mixture is about 0.1 to about 0.5 and the molar ratio of [S+M]/[L] residues is about 0.7 to about 2.0, and wherein the mixture of structured glycerol ester compositions contains a stable alpha crystal phase.

2. The edible moisture barrier composition of claim 1 wherein the molar ratio of [M]/[S] residues is about 0.15 to about 0.35 and the molar ratio of [S+M]/[L] residues is about 1.2 to about 1.8.

3. The edible moisture barrier composition of claim 1 wherein the mixture of structured glycerol esters comprises about 44 to about 65 percent SSL triacylglycerols and about 17 to about 27 percent SML triacylglycerols.

4. The edible moisture barrier composition of claim 1, wherein the barrier composition has a solid fat content of from about 50 to about 80 weight percent at about 0 to about 5° C.

5. The edible moisture barrier composition of claim 1, wherein the barrier composition has a solid fat content of from about 55 to about 75 weight percent at about 0 to about 5° C.

6. The edible moisture barrier composition of claim 1, wherein the barrier composition has a solid fat content of from about 60 to about 70 weight percent at about 0 to about 5° C.

7. The edible moisture barrier composition of claim 1, wherein the barrier composition has a solid fat content of less than about 5 weight percent above about 37° C.

8. The edible moisture barrier composition of claim 1, wherein the barrier composition delivers less than about 7 kcal/g.

9. The edible moisture barrier composition of claim 1, wherein the barrier composition delivers about 5 to about 7 kcal/g.

10. The edible moisture barrier composition of claim 1, wherein the barrier composition is essentially free of trans-unsaturated fatty acids.

11. The edible moisture barrier composition of claim 1, wherein the short fatty acid residues are derived at least one of the group consisting of triacetin and a mixture of triacetin, tripropionin, and tributyrin.

12. The edible moisture barrier composition of claim 1, wherein the edible moisture barrier is about 50 microns to about 2 mm thick.

13. A method for reducing moisture migration between foods comprising applying an edible moisture barrier composition to a food component, wherein the edible moisture barrier composition comprises a mixture of structured glycerol ester compositions having the general formula (A):

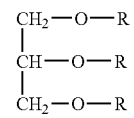

(A)

where each R group represents a short fatty acid residue "S" of 2 to 4 carbons, a medium fatty acid residue "M" having 6 to 12 carbons, or a saturated long fatty acid residue "L" having 14 to 22 carbons, the mixture comprising about 23 to about 70 percent SSL triacylglycerols and about 6 to about 30 percent SML triacylglycerols, and wherein the molar ratio of [M]/[S] residues in the mixture is about 0.1 to about 0.5 and the molar ratio of [S+M]/[L] residues is about 0.7 to about 2.0, and wherein the mixture of structured glycerol ester compositions contains a stable alpha crystal phase.

14. The method of claim 13 wherein the mixture of structured glycerol esters has molar ratio of [M]/[S] residues in the mixture is about 0.15 to about 0.35 and the molar ratio of [S+M]/[L] residues is about 1.2 to about 1.8.

15. The method of claim 13 wherein the mixture of structured glycerol esters comprises about 44 to about 65 percent SSL triacylglycerols and about 17 to about 27 percent SML triacylglycerols.

16. The method of claim 13 wherein the edible moisture barrier composition is effective for reducing moisture migration between foods to a level less than about 5 percent over a 50 day storage period.

17. The method of claim 13, wherein the edible moisture barrier composition is about 50 microns to about 2 mm thick.

18. The method of claim 13, wherein the edible moisture barrier composition has a solid fat content of from about 50 to about 80 weight percent at about 0 to about 5° C.

19. The method of claim 13, wherein the edible moisture barrier composition has a solid fat content of from about 55 to about 75 weight percent at about 0 to about 5° C.

20. The method of claim 13, wherein the edible moisture barrier composition has a solid fat content of from about 60 to about 70 weight percent at about 0 to about 5° C.

21. The method of claim 13, wherein the edible moisture barrier composition delivers less than about 7 kcal/g.

22. The method of claim 13, wherein the edible moisture barrier composition delivers about 5 to about 7 kcal/g.

23. The method of claim 13, wherein the short fatty acid residues are derived at least one of the group consisting of triacetin and a mixture of triacetin, tripropionin, and tributyrin.

* * * * *